(12) United States Patent
Varghese et al.

(10) Patent No.: US 11,554,562 B2
(45) Date of Patent: Jan. 17, 2023

(54) METHOD FOR REPAIRING TIRE TREAD

(71) Applicant: Bridgestone Americas Tire Operations, LLC, Nashville, TN (US)

(72) Inventors: Anoop G. Varghese, Fairlawn, OH (US); Thomas A. Sams, Alliance, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 641 days.

(21) Appl. No.: 16/553,801

(22) Filed: Aug. 28, 2019

(65) Prior Publication Data

US 2020/0086592 A1 Mar. 19, 2020

Related U.S. Application Data

(60) Provisional application No. 62/732,730, filed on Sep. 18, 2018.

(51) Int. Cl.
*B29C 73/06* (2006.01)

(52) U.S. Cl.
CPC .................. *B29C 73/06* (2013.01)

(58) Field of Classification Search
CPC ..................................... B29C 73/06
See application file for complete search history.

(56) References Cited

U.S. PATENT DOCUMENTS

| | | | |
|---|---|---|---|
| 1,372,938 A | 3/1921 | Coffield | |
| 2,566,797 A | 9/1951 | Heintz | |
| 3,007,506 A | 11/1961 | Bowler | |
| 3,730,247 A | 5/1973 | White | |
| 4,093,481 A | 6/1978 | Schelkmann | |
| 4,765,852 A | 8/1988 | Koch et al. | |
| 4,923,543 A * | 5/1990 | Koch | C08J 7/126 156/97 |
| 5,139,840 A | 8/1992 | Ferrara | |
| 5,695,577 A | 12/1997 | Ferrara | |
| 8,720,510 B2 | 5/2014 | Zarak | |
| 9,370,971 B2 * | 6/2016 | Colby | B60C 11/02 |
| 2013/0306212 A1 | 11/2013 | Shouyama | |

FOREIGN PATENT DOCUMENTS

| | | |
|---|---|---|
| DE | 2938114 A1 | 4/1981 |
| DE | 4000228 A1 | 7/1991 |
| EP | 0122480 B1 | 3/1989 |
| EP | 0555632 B1 | 11/1995 |
| FR | 2169725 A1 | 9/1973 |

* cited by examiner

*Primary Examiner* — Jeffry H Aftergut
*Assistant Examiner* — Jaeyun Lee
(74) *Attorney, Agent, or Firm* — Shaun J. Fox; Thomas Y. Kendrick

(57) ABSTRACT

Various method for repairing a tire tread are provided. In one embodiment, a method for repairing a tire tread comprises: providing a tire having a tire tread portion wherein the tire tread portion includes a tread element that is at least one of a tread block and a tread rib, and wherein the tread element includes a void resulting from wear or damage of the tire tread portion; removing a material from at least a portion of the tread element adjacent to the void to create a removed material portion, wherein the removed material portion includes a specific shape corresponding to a replacement element; applying an adhesive to at least one surface of the removed material portion; applying the replacement element to the removed material portion; and curing the adhesive.

10 Claims, 12 Drawing Sheets

METHOD FOR REPAIRING TIRE TREAD

CROSS-REFERENCE TO RELATED APPLICATIONS

This application claims priority from U.S. Provisional Patent Application No. 62/732,730, filed on Sep. 18, 2018, which is incorporated by reference herein in its entirety.

BACKGROUND

Tires used on vehicles typically wear with use via interaction with the hard surfaces upon which the vehicle is operated. Due to a variety of factors, the wear can be irregular. Irregular wear is generally tire wear that is not uniform across the width of a contact patch of a tire about its entire circumference. For example, some tires may develop heel-toe wear, which may result in tread blocks with higher wear on a heel portion or toe portion (relative to the direction of rotation), and which may be caused by out of specification tire/wheel alignment. Additionally, a tire's tread may wear more in the axially outer edges of the tread, or axially inner portion of the tread, which may be caused by under inflation or over inflation, respectively.

In some instances, tires may develop a localized section of high wear, which may initially be limited to a specific circumferential section of a tire's tread. For example, a tire may experience a circumferentially-localized area of high wear in a shoulder rib/shoulder blocks due misalignment or the input of small steering angle to overcome a road crown. In another example, a tire may experience irregular wear in any localized section of a tread, due to any of a variety of factors. Inevitably, irregular wear that may initially be localized, will propagate through at least some of the rest of the tread, an perhaps circumferentially around the tread. Once the irregular wear propagates, the life of the tire tread is typically much shorter than the same tire tread without irregular wear.

Additionally, a tire's tread may be damaged via contact with sharp rocks, metal, etc. that may be present in a roadway or off-road location. This damage may result in the tire's tread, for example, a tread block, having a large portion cut or torn away. This area of localized damage may propagate due to the void in the ground-contacting portion of the tread.

When irregular wear or tire tread damage is recognized early, and has not propagated through the entirety of the tread, the tire tread may be repaired to extend the life of the tire and delay or prevent propagation of wear. What is needed is a method for repairing a tire tread that experiences uneven wear or damage.

SUMMARY

In one embodiment, a method for repairing a tire tread is provided, the method comprising: providing a tire having a tire tread portion wherein the tire tread portion includes a tread element that is at least one of a tread block and a tread rib, and wherein the tread element includes a void resulting from wear or damage of the tire tread portion; removing a material from at least a portion of the tread element adjacent to the void to create a removed material portion, wherein the removed material portion includes a specific shape corresponding to a replacement element; applying an adhesive to at least one surface of the removed material portion; applying the replacement element to the removed material portion; and curing the adhesive.

In another embodiment, a method for repairing a tire tread is provided, the method comprising: providing a tire having a tire tread portion wherein the tire tread portion includes a tread block, wherein the tread block includes a radially outer running surface having a first end with a radial height $R1$ and a second end with a radial height $R2$, wherein the first end is circumferentially spaced from the second end, and wherein radial height $R1$ is greater than radial height $R2$; removing a material from a radially outermost portion of the tread block to create a removed material portion, wherein the removed material portion includes a specific shape corresponding to a replacement; applying an adhesive to at least one surface of the removed material portion; applying the replacement element to the removed material portion; and curing the adhesive.

BRIEF DESCRIPTION OF THE DRAWINGS

The accompanying figures, which are incorporated in and constitute a part of the specification, illustrate various example configurations and methods, and are used merely to illustrate various example embodiments. In the figures, like elements bear like reference numerals.

DETAILED DESCRIPTION

Various factors may cause irregular wear in a tire tread. For example, heel-toe wear may result from tire/wheel misalignment, including for example, excessive positive or negative toe. Additionally, tread wear may result from out of specification alignment including caster or camber settings. Tread wear may also result from over inflation, under inflation, or over loading of a tire. Finally, tread wear may result from steering angle input, which may result from a vehicle driving on a roadway with a crown (a crown may be used to cause water to run from a roadway, and may cause the vehicle operating on that roadway to have a certain degree of "roll"), wherein the vehicle must use steering angle input to keep the vehicle centered on the roadway.

Some tire tread patterns may be more susceptible to irregular wear than others. For example, a truck or bus radial steer tire with a straight rib, which may be commonly installed on large trucks and/or buses, may be susceptible to forming an irregular wear "spot" on an outside shoulder of the tread. In some tires, applied to various irregular wear-inducing factors such as tire/wheel misalignment and excess steering angle input, irregular wear may most commonly appear in the shoulder region of the tire, which is understood to include the axially-outer portions of the tire tread.

Figure 1A:
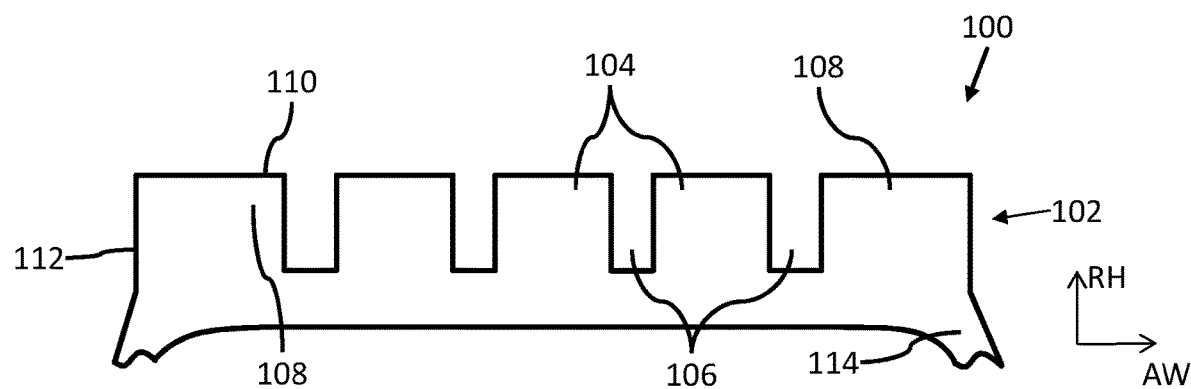
FIG. 1A illustrates a sectional view of an example tire 100 without irregular wear.
Figure 1B:
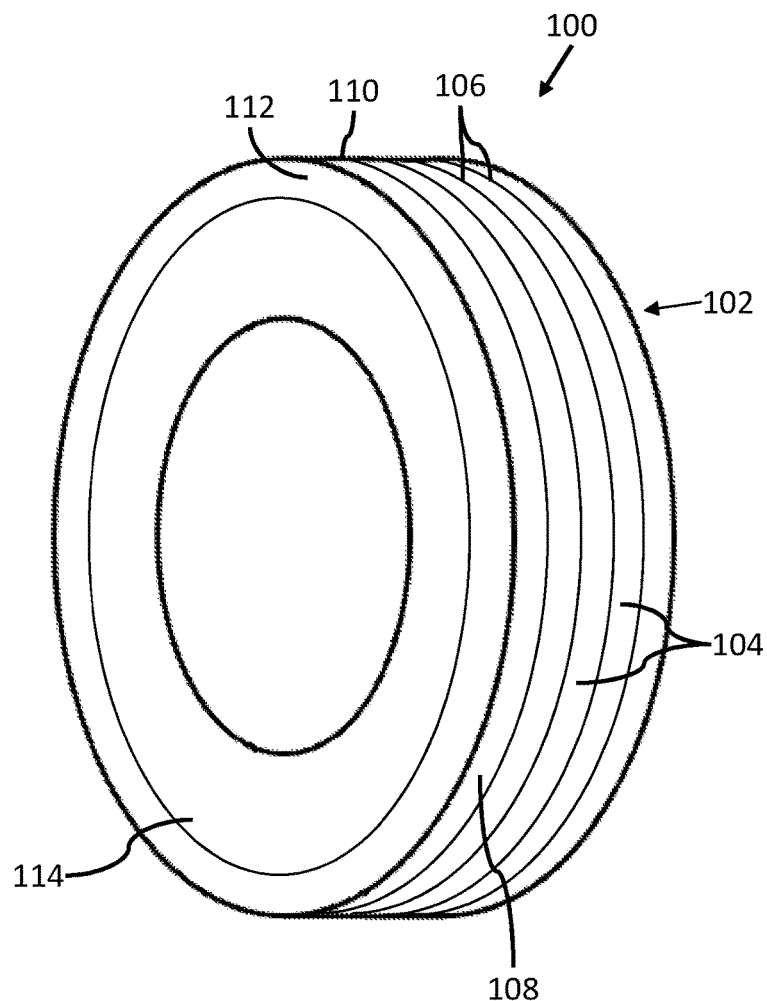
FIG. 1B illustrates a perspective view of an example tire 100 without irregular wear.

FIGS. 1A and 1B illustrate an example tire 100 without irregular wear. Tire 100 may include a tire tread portion 102 having at least one tread element 104. One tread element 104 may be separated from another tread element 104 by at least one circumferential groove 106. Tread portion 102 may include a plurality of tread elements 104 separated from one another by a plurality of circumferential grooves 106. Axially outermost tread elements 104 may include shoulder elements 108. Any of tread elements 104 and shoulder elements 108 may include a radially outermost surface 110. Any of tread elements 104 and shoulder elements 108 may include an element sidewall 112. Tire 100 may include tire sidewalls 114 oriented at a position at or near the generally axially outward edges of tread portion 102, and radially inwardly of tread portion 102.

At least one tread element 104, including shoulder elements 108, may be a tread block or a tread rib. A tread rib is understood to be a continuous circumferential tread element, while tread blocks are understood to be discontinuous in the circumferential direction and are broken up by transverse grooves. It is understood that tread portion 102 may be made up of a mixture of tread ribs and tread blocks, such that one or more tread element 104, including shoulder elements 108, may be a tread block, while one another of one or more tread element 104, including shoulder elements 108, may be a tread rib.

Circumferential groove 106 may include a continuous circumferential groove. Circumferential groove 106 may include a discontinuous circumferential groove. Circumferential groove 106 may include a plurality of circumferential grooves 106, including a mixture continuous circumferential grooves and discontinuous circumferential grooves.

Figure 2A:
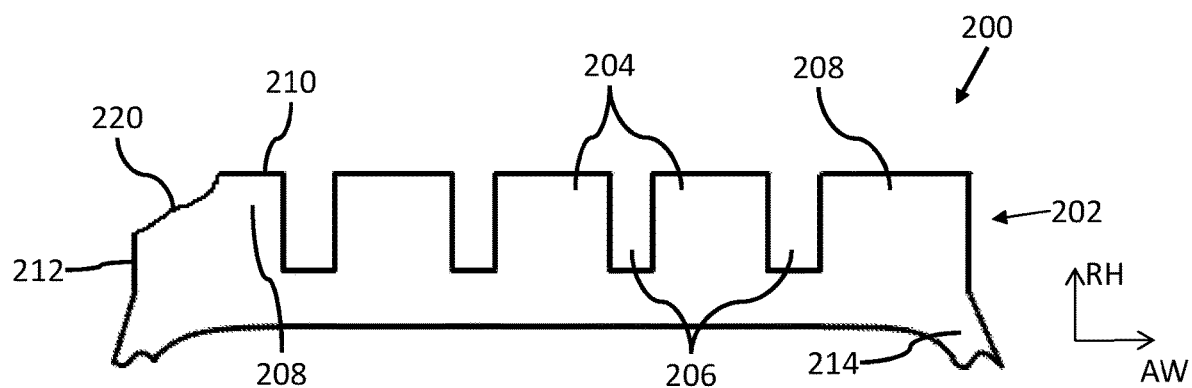
FIG. 2A illustrates a sectional view of an example tire 200 with irregular wear.
Figure 2B:
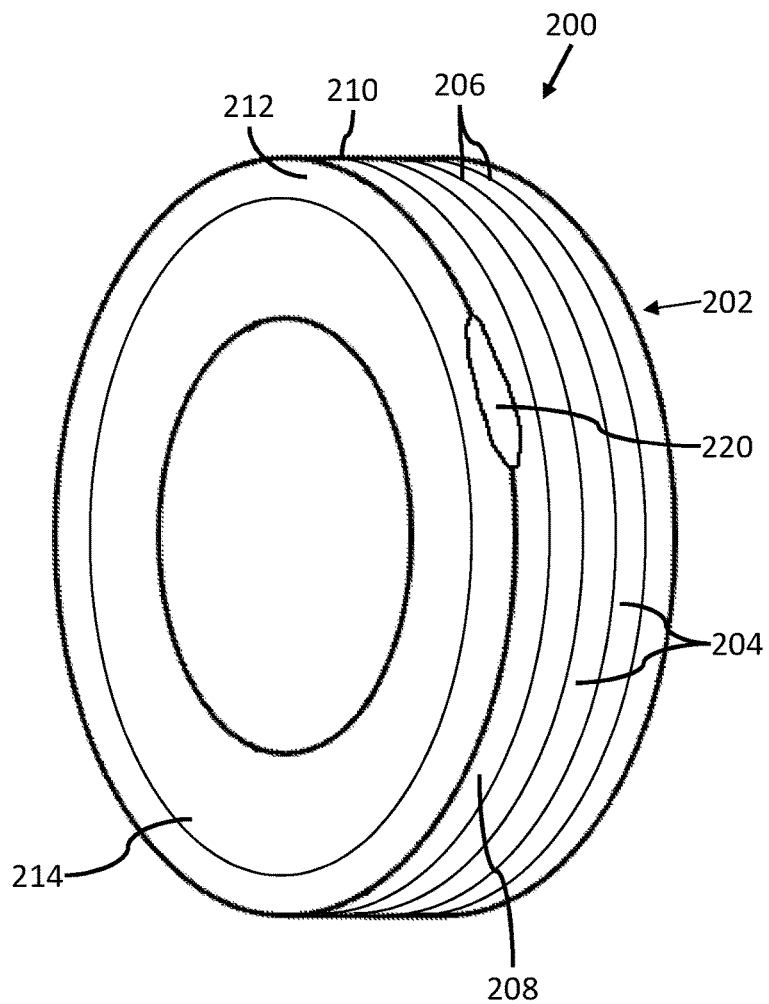
FIG. 2B illustrates a perspective view of an example tire 200 with irregular wear.

FIGS. 2A and 2B illustrate an example tire 200 with irregular wear. Tire 200 may include a tire tread portion 202 having at least one tread element 204. One tread element 204 may be separated from another tread element 204 by at least one circumferential groove 206. Tread portion 202 may include a plurality of tread elements 204 separated from one another by a plurality of circumferential grooves 206. Axially outermost tread elements 204 may include shoulder elements 208. Any of tread elements 204, including shoulder elements 208, may include a radially outermost surface 210. Any of tread elements 204, including shoulder elements 208, may include an element sidewall 212. Tire 200 may include tire sidewalls 214 oriented at a position at or near the generally axially outward edges of tread portion 202, and radially inwardly of tread portion 202.

At least one tread element 204, including shoulder elements 208, may be a tread block or a tread rib.

Tread portion 202 may include an irregular wear void 220. Void 220 may result from wear or damage of tread portion 202. Any of tread elements 204, including shoulder elements 208, may include void 220.

Void 220 may be an area where any tread element 204, including shoulder element 208, has been worn away or otherwise removed via damage to tread portion 202. Void 220 may be oriented in an axially outer portion of shoulder element 208. Void 220 may be oriented in any portion of shoulder element 208. Void 220 may be oriented in an axially outer portion of any tread element 204. Void 220 may be oriented in any portion of any tread element 204. Void 220 may include a localized area of wear or damage, not extending around the entire circumference of tire 200. Void 220 may have any of a variety of cross-sectional shapes, including for example, a substantially triangular shape. Void 220 may extend along a line inclined relative to a radial direction of tire 200.

Figure 3A:
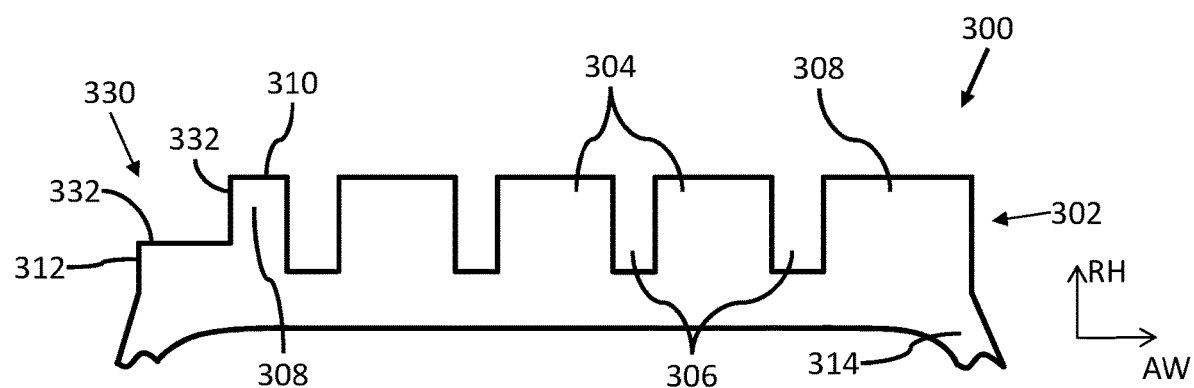
FIG. 3A illustrates a sectional view of an example tire 300 with a removed material portion.
Figure 3B:
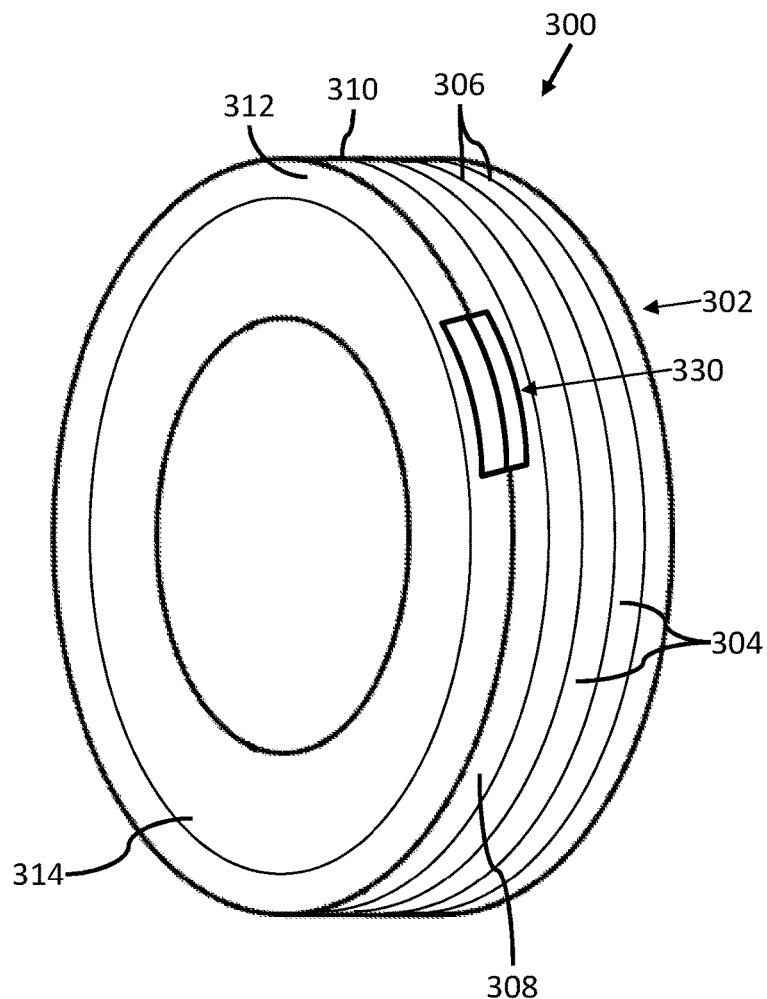
FIG. 3B illustrates a perspective view of an example tire 300 with a removed material portion.

FIGS. 3A and 3B illustrate an example tire 300 with a removed material portion 330. Tire 300 may include a tire tread portion 302 having at least one tread element 304. One tread element 304 may be separated from another tread element 304 by at least one circumferential groove 306. Tread portion 302 may include a plurality of tread elements 304 separated from one another by a plurality of circumferential grooves 306. Axially outermost tread elements 304 may include shoulder elements 308. Any of tread elements 304, including shoulder elements 308, may include a radially outermost surface 310. Any of tread elements 304, including shoulder elements 308, may include an element sidewall 312. Tire 300 may include tire sidewalls 314 oriented at a position at or near the generally axially outward edges of tread portion 302, and radially inwardly of tread portion 302.

At least one tread element 304, including shoulder elements 308, may be a tread block or a tread rib.

Tread portion 302 may include a removed material portion 330, which may be a specific portion of tread portion 302 that has been removed by a user in preparation for repair of tread portion 302. Removed material portion 330 may have any of a variety of cross-sectional shapes, including for example, a square, a rectangle, a triangle, a circular sector, and the like. Removed material portion 330 may have a cross-sectional shape that is the same of the cross-sectional shape of a replacement element (not shown) to be placed in removed material portion 330 during the repair of tread portion 302.

Removed material portion 330 corresponds to a segment of tread portion 302 that previously included a void, such as void 220 illustrated in FIGS. 2A and 2B. Removed material portion 330 may extend radially inwardly into tread portion 302 farther than the void (e.g., void 220) that previously existed in tread portion 302. Removed material portion 330 may extend axially inwardly into tread portion 302 farther than the void (e.g., void 220) that previously existed in tread portion 302. Where a void is oriented on an axially inner side of tread element 304, including shoulder element 308, removed material portion 330 may extend axially outward into tread element 304 than the void (e.g., void 220) that previously existed in tread portion 302. It is understood that removed material portion 330 will cover an area at least equal, and possibly exceeding, the area of the void that previously existed in tread portion 302, such that removed material portion 330 may have machined walls 332 that are substantially smooth and/or flat. The smooth and/or flat nature of machined walls 332 may allow machined walls 332 to accurately mate with tire contact edges (not shown) of a replacement element (not shown).

A user may create removed material portion 330 in tread portion 302 via any of a variety of mechanisms, including: via hand with a knife, cutting tool, rasp, saw, or the like, any of which may remove material in a predetermined shape; via a power tool such as a rotary or oscillating tire buffer, which may include a rasp, abrasive wheel, or abrasive cone, any of which may remove material in a predetermined shape; via an automated machine, including for example a robotic machine, which may employ any of a variety of cutters or tire buffers to the tire to remove a material in a predetermined shape. It is understood that a user may create removed material portion 330 in a predetermined shape, which coincides with the shape of a replacement element to be applied to removed material portion 330.

Figure 4:
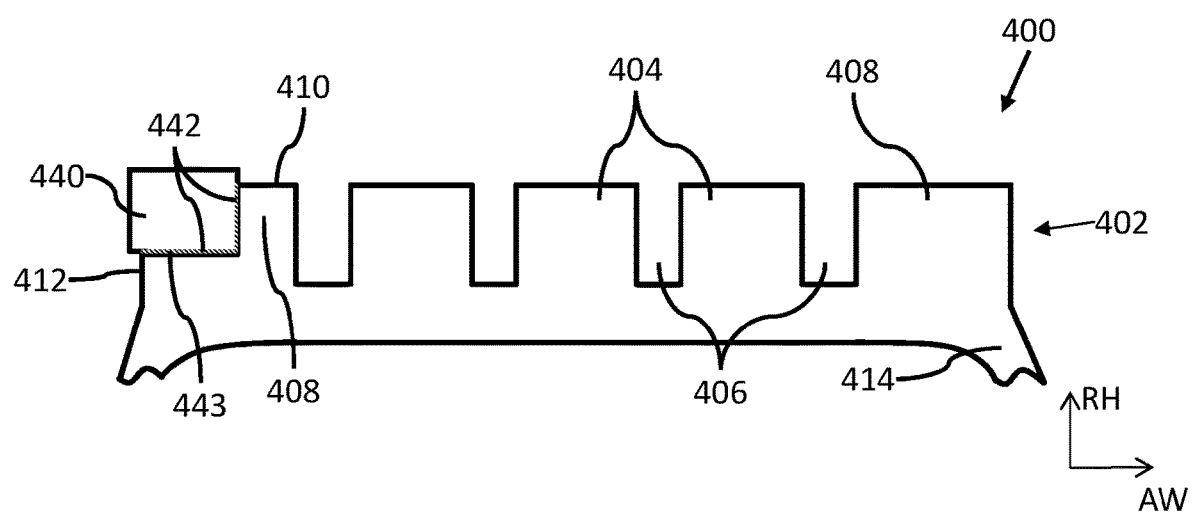
FIG. 4 illustrates a sectional view of an example tire 400 with a replacement element applied to a removed material portion.

FIG. 4 illustrates an example tire 400 with a replacement element 440 applied to a removed material portion. Tire 400 may include a tire tread portion 402 having at least one tread element 404. One tread element 404 may be separated from another tread element 404 by at least one circumferential groove 406. Tread portion 402 may include a plurality of tread elements 404 separated from one another by a plurality of circumferential grooves 406. Axially outermost tread elements 404 may include shoulder elements 408. Any of tread elements 404, including shoulder elements 408, may include a radially outermost surface 410. Any of tread elements 404, including shoulder elements 408, may include an element sidewall 412. Tire 400 may include tire sidewalls 414 oriented at a position at or near the generally axially outward edges of tread portion 402, and radially inwardly of tread portion 402.

At least one tread element 404, including shoulder elements 408, may be a tread block or a tread rib.

Replacement element 440 may include one or more tire contact edge 442. One or more tire contact edge 442 may correspond to one or more machined walls illustrated in FIG. 3A. That is, replacement element 440 may be designed to specifically fit into removed material portion 330 of FIG. 3A, such that tire contact edges 442 may engage machined walls 332. Replacement element 440 may be made from the same material, or a similar material, as tread portion 402, including for example a rubber.

Replacement element 440 may have an axial width, and radial height, larger than that of removed material portion 330 of FIG. 3A. Where removed material portion 330 is localized, and does not extend completely around the circumference of the tire, replacement element 440 may have the same circumferential length of removed material portion 330. Alternatively, replacement element 440 may have an axial width, radial height, wherein at least one of the axial width and radial height is the same as that of removed material portion 330.

In practice, a series of replacement elements 440 of varying dimensions may be provided. A user may assess the dimensions of the void (220), and cut the removed material portion (330) to a size larger than the void (220), in one or both of the radial height and axial width dimensions. The user may then apply a replacement element 440 to the removed material portion (330) that is equal to, or larger than, the removed material portion (330), in one or both of the radial height and axial width dimensions.

Replacement element 440 may be a pre-cured rubber element.

Before application of replacement element 440 to the removed material portion (330), an adhesive may be applied to one or more of tire contact edges 442 and machined walls (332), forming an adhesive layer 443. In this manner, replacement element 440 may be fixed to the removed material portion (330) via adhesive layer 443.

The adhesive used in adhesive layer 443 may be any variety of adhesives capable of adhering two pre-cured rubber items to one another. The adhesive may be cured via heat curing, which requires application of heat at a specified temperature, for a specified period of time to effect the curing of the adhesive. The adhesive may be a tire cement. The adhesive may be a self-vulcanizing cement, which does not require heat to cure. The adhesive may be a heat cure cement.

Figure 5A:
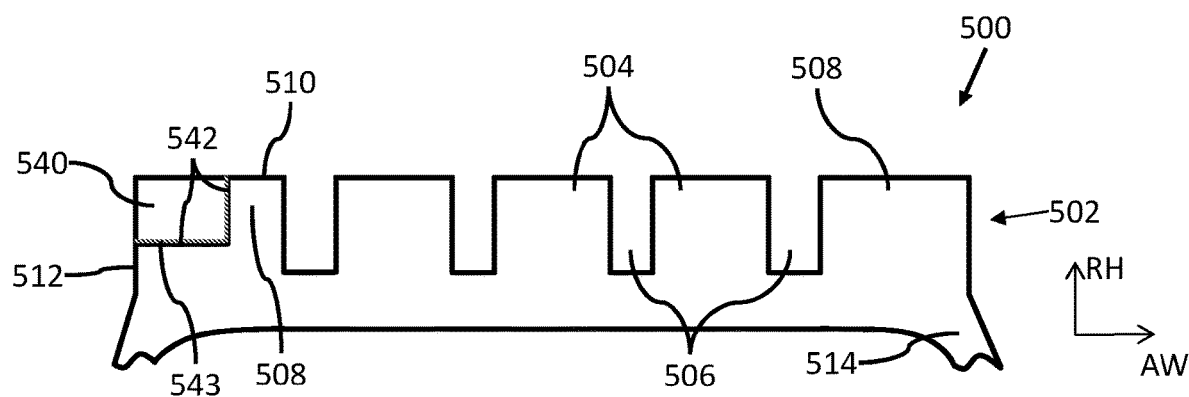
FIG. 5A illustrates a sectional view of an example tire 500 with a replacement element fitted in a removed material portion.
Figure 5B:
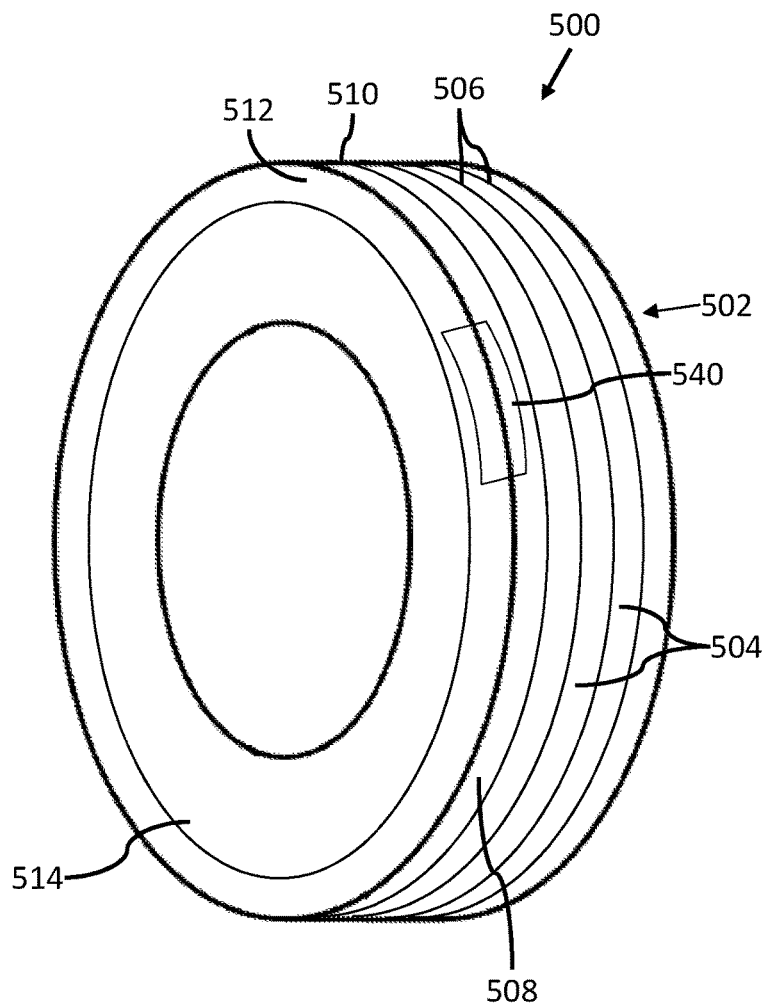
FIG. 5B illustrates a perspective view of an example tire 500 with a replacement element fitted in a removed material portion.

FIGS. 5A and 5B illustrate an example tire 500 with a replacement element 540 fitted in a removed material portion. Tire 500 may include a tire tread portion 502 having at least one tread element 504. One tread element 504 may be separated from another tread element 504 by at least one circumferential groove 506. Tread portion 502 may include a plurality of tread elements 504 separated from one another by a plurality of circumferential grooves 506. Axially outermost tread elements 504 may include shoulder elements 508. Any of tread elements 504, including shoulder elements 508, may include a radially outermost surface 510. Any of tread elements 504, including shoulder elements 508, may include an element sidewall 512. Tire 500 may include tire sidewalls 514 oriented at a position at or near the generally axially outward edges of tread portion 502, and radially inwardly of tread portion 502.

At least one tread element 504, including shoulder elements 508, may be a tread block or a tread rib.

Replacement element 540 may have dimensions perfectly matching those of the removed material portion (330), at least in the radial height and axial width dimensions.

Alternatively, replacement element 540 may be oversized (such as replacement element 440 illustrated in FIG. 4). Thus, following curing of adhesive layer 543, securing tire contact edges 542 to the machined walls (332), replacement element 540 may be fitted (trimmed) such that the radially outermost portion of replacement element 540 is even with radially outermost surface 510, and such that its axially outmost portion is even with element sidewall 512. Replacement element 540 may be fitted (trimmed) such that the radially outermost portion of replacement element 540 is even with the radially outermost surface 510 of tread element 504 adjacent to replacement element 540. Replacement element 540 may be fitted (trimmed) such that the axially outermost portion of replacement element 540 is even with the axially outermost surface tread element 504 adjacent to replacement element 540. Replacement element 540 may be fitted (trimmed) such that the radially outermost portion of replacement element 540 is coplanar with the radially outermost surface 510 of tread element 504 adjacent to replacement element 540. Replacement element 540 may be fitted (trimmed) such that the axially outermost portion of replacement element 540 is coplanar with the axially outermost surface tread element 504 adjacent to replacement element 540.

Additionally, in some aspects, fitting of replacement element 540 may include shaping of replacement element 540, including for example, adding a chamfer, filet, groove, notch, sipe, and the like to match the original tread profile. Fitting of replacement element 540 in this manner may include any of the material removal methods and apparatuses as described above with respect to the creation of removed material portion 330 in FIGS. 3A and 3B. For example, replacement element 540 may be buffed to obtain the desired dimensions of replacement element 540.

As illustrated in FIGS. 5A and 5B, replacement element 540 may in this manner be fitted to match the remainder of tread portion 502, such that tread portion 502 is repaired and has a similar appearance to tread portion 102 illustrated in FIGS. 1A and 1B.

Figure 6A:
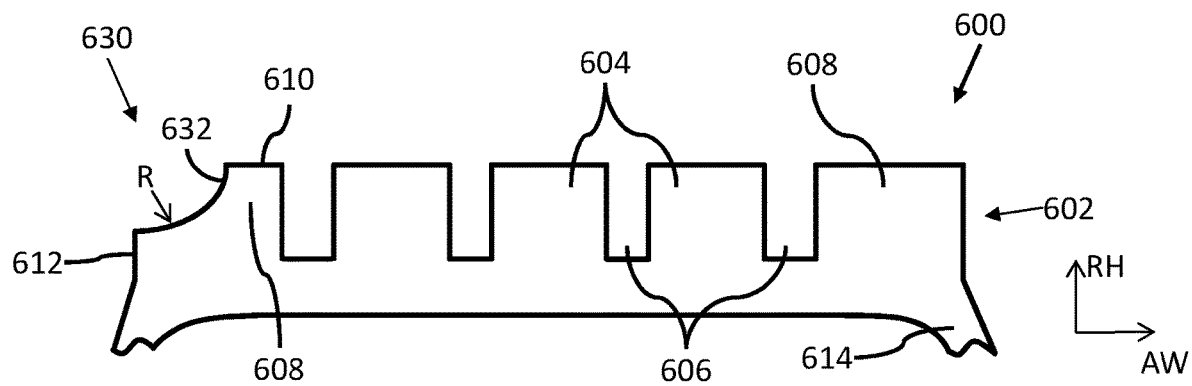
FIG. 6A illustrates a sectional view of an example tire 600 with a removed material portion.
Figure 6B:
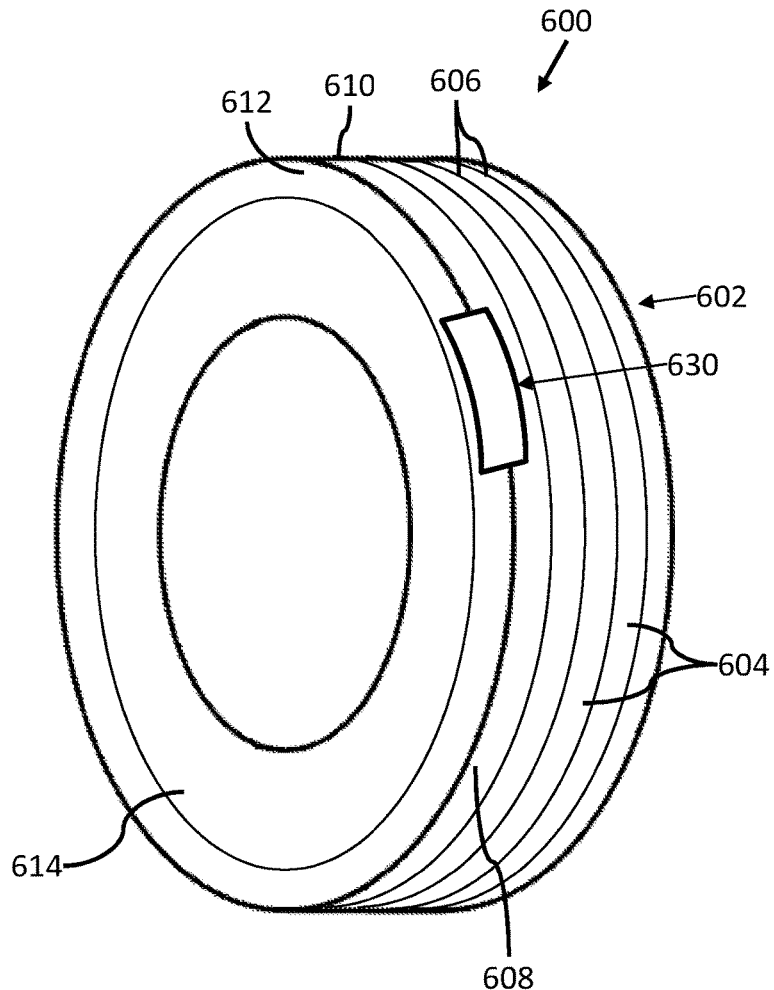
FIG. 6B illustrates a perspective view of an example tire 600 with a removed material portion.

FIGS. 6A and 6B illustrate an example tire 600 with a removed material portion 630.

FIG. 6B illustrates a perspective view of an example tire 600 with a removed material portion. Tire 600 may include a tire tread portion 602 having at least one tread element 604. One tread element 604 may be separated from another tread element 604 by at least one circumferential groove 606. Tread portion 602 may include a plurality of tread elements 604 separated from one another by a plurality of circumferential grooves 606. Axially outermost tread elements 604 may include shoulder elements 608. Any of tread elements 604, including shoulder elements 608, may include a radially outermost surface 610. Any of tread elements 604, including shoulder elements 608, may include an element sidewall 612. Tire 600 may include tire sidewalls 614 oriented at a position at or near the generally axially outward edges of tread portion 602, and radially inwardly of tread portion 602.

At least one tread element 604, including shoulder elements 608, may be a tread block or a tread rib.

Tread portion 602 may include a removed material portion 630, which may be a specific portion of tread portion 602 that has been removed by a user in preparation for repair of tread portion 602. Removed material portion 630 may have any of a variety of cross-sectional shapes, including for example a circular sector. Removed material portion 630 may have a cross-sectional shape that is the same of the cross-sectional shape of a replacement element (not shown) to be placed in removed material portion 630 during the repair of tread portion 602.

Removed material portion 630 corresponds to a segment of tread portion 602 that previously included a void, such as void 620 illustrated in FIGS. 2A and 2B. Removed material portion 630 may extend radially inwardly into tread portion 602 farther than the void (e.g., void 220) that previously existed in tread portion 602. Removed material portion 630 may extend axially inwardly into tread portion 602 farther than the void (e.g., void 220) that previously existed in tread portion 602. Where a void is oriented on an axially inner side of tread element 604, including shoulder element 608, removed material portion 630 may extend axially outward into tread element 604 than the void (e.g., void 220) that previously existed in tread portion 602. It is understood that removed material portion 630 will cover an area at least equal, and possibly exceeding, the area of the void that previously existed in tread portion 602, such that removed material portion 630 may have a machined wall 632 that is substantially smooth and/or flat. The smooth and/or flat nature of machined wall 632 may allow accurate mating of machined wall 632 with tire contact edges (not shown) of a replacement element to be added to removed material portion 630.

A user may create removed material portion 630 in tread portion 602 via any of a variety of mechanisms, including each of those described above with respect to the creation of removed material portion 330 in FIGS. 3A and 3B. For example, removed material portion 630 may be formed by buffing the material away. It is understood that a user may create removed material portion 630 in a predetermined shape, which coincides with the shape of a replacement element to be applied to removed material portion 630.

Figure 7:
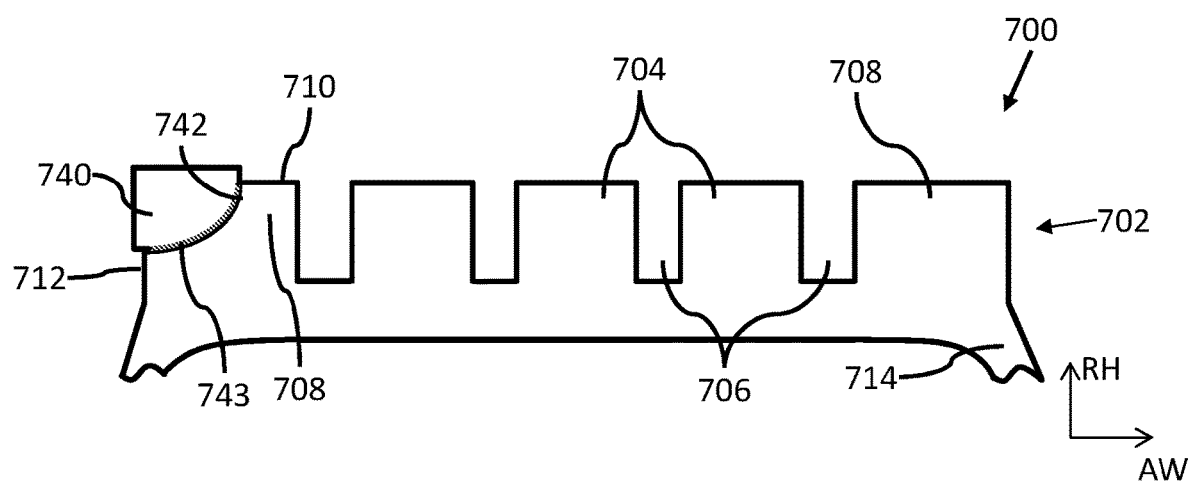
FIG. 7 illustrates a sectional view of an example tire 700 with a replacement element applied to a removed material portion.

FIG. 7 illustrates an example tire 700 with a replacement element 740 applied to a removed material portion. Tire 700 may include a tire tread portion 702 having at least one tread element 704. One tread element 704 may be separated from another tread element 704 by at least one circumferential groove 706. Tread portion 702 may include a plurality of tread elements 704 separated from one another by a plurality of circumferential grooves 706. Axially outermost tread elements 704 may include shoulder elements 708. Any of tread elements 704, including shoulder elements 708, may include a radially outermost surface 710. Any of tread elements 704, including shoulder elements 708, may include an element sidewall 712. Tire 700 may include tire sidewalls 714 oriented at a position at or near the generally axially outward edges of tread portion 702, and radially inwardly of tread portion 702.

At least one tread element 704, including shoulder elements 708, may be a tread block or a tread rib.

Replacement element 740 may include one or more tire contact edge 742. One or more tire contact edge 742 may correspond to one or more machined wall 632 illustrated in FIG. 6A. That is, replacement element 740 may be designed to specifically fit into removed material portion 630 of FIG. 6A, such that tire contact edge 742 may engage machined wall 632. Replacement element 740 may be made from the same material, or a similar material, as tread portion 702, including for example a rubber.

Replacement element 740 may have an axial width, and radial height, larger than that of removed material portion 630 of FIG. 6A. Where removed material portion 630 is localized, and does not extend completely around the circumference of the tire, replacement element 740 may have the same circumferential length of removed material portion 630. Alternatively, replacement element 740 may have an axial width, radial height, wherein at least one of the axial width and radial height is the same as that of removed material portion 630.

In practice, a series of replacement elements 740 of varying dimensions may be provided. A user may assess the dimensions of the void (220), and cut the removed material portion (630) to a size larger than the void (220), in one or both of the radial height and axial width dimensions. The user may then apply a replacement element 740 to the removed material portion (630) that is equal to, or larger than, the removed material portion (630), in one or both of the radial height and axial width dimensions.

Replacement element 740 may be a pre-cured rubber element.

Before application of replacement element 740 to the removed material portion (630), an adhesive may be applied to one or more of tire contact edge 742 and machined wall (632), forming an adhesive layer 743. In this manner, replacement element 740 may be fixed to the removed material portion (630) via adhesive layer 743.

The adhesive used in adhesive layer 743 may be any variety of adhesives capable of adhering two pre-cured rubber items to one another, including those described above with respect to adhesive layer 443 in FIG. 4.

Figure 8A:
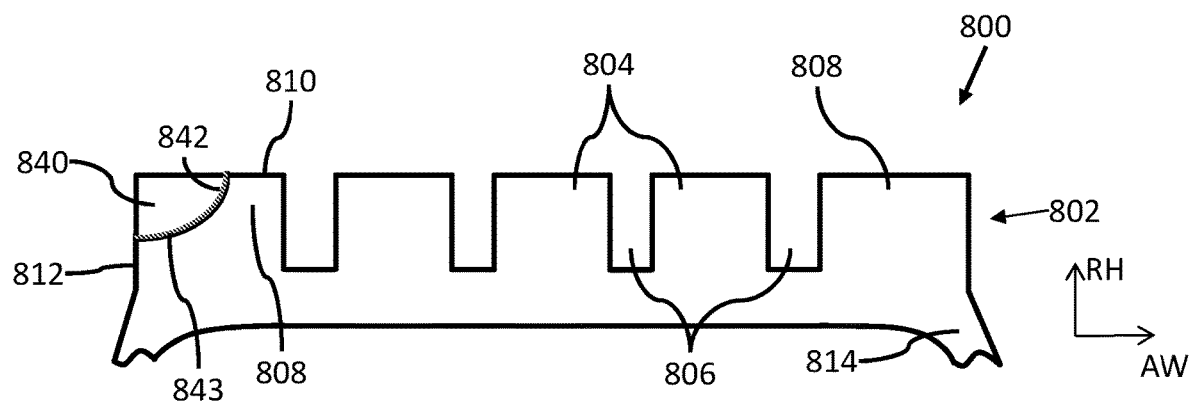
FIG. 8A illustrates a sectional view of an example tire 800 with a replacement element fitted in a removed material portion.
Figure 8B:
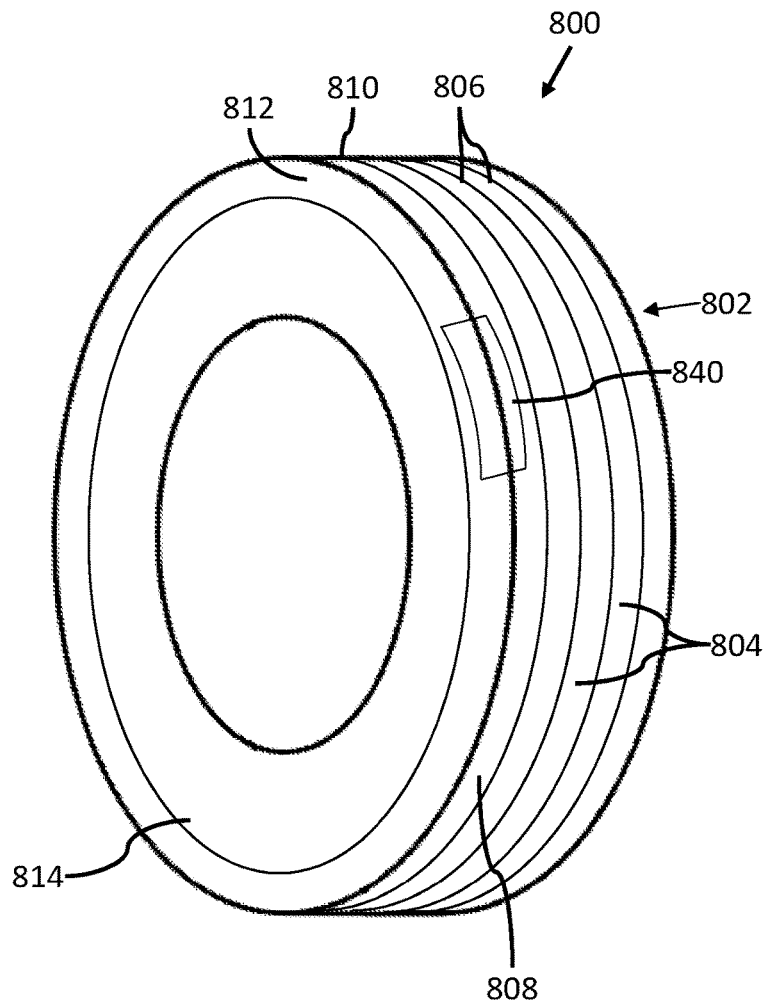
FIG. 8B illustrates a perspective view of an example tire 800 with a replacement element fitted in a removed material portion.

FIGS. 8A and 8B illustrate an example tire 800 with a replacement element 840 fitted in a removed material portion. Tire 800 may include a tire tread portion 802 having at least one tread element 804. One tread element 804 may be separated from another tread element 804 by at least one circumferential groove 806. Tread portion 802 may include a plurality of tread elements 804 separated from one another by a plurality of circumferential grooves 806. Axially outermost tread elements 804 may include shoulder elements 808. Any of tread elements 804, including shoulder elements 808, may include a radially outermost surface 810. Any of tread elements 804, including shoulder elements 808, may include an element sidewall 812. Tire 800 may include tire sidewalls 814 oriented at a position at or near the generally axially outward edges of tread portion 802, and radially inwardly of tread portion 802.

At least one tread element 804, including shoulder elements 808, may be a tread block or a tread rib.

Replacement element 840 may have dimensions perfectly matching those of the removed material portion (630), at least in the radial height and axial width dimensions.

Alternatively, replacement element 840 may be oversized (such as replacement element 740 illustrated in FIG. 7). Thus, following curing of adhesive layer 843, securing tire contact edge 842 to the machined wall (632), replacement element 840 may be fitted (trimmed) such that the radially outermost portion of replacement element 840 is even with radially outermost surface 810, and such that its axially outmost portion is even with element sidewall 812. Replacement element 840 may be fitted (trimmed) such that the radially outermost portion of replacement element 840 is even with the radially outermost surface 810 of tread element 804 adjacent to replacement element 840. Replacement element 840 may be fitted (trimmed) such that the axially outermost portion of replacement element 840 is even with the axially outermost surface tread element 804 adjacent to replacement element 840. Replacement element 840 may be fitted (trimmed) such that the radially outermost portion of replacement element 840 is coplanar with the radially outermost surface 810 of tread element 804 adjacent to replacement element 840. Replacement element 840 may be fitted (trimmed) such that the axially outermost portion of replacement element 840 is coplanar with the axially outermost surface tread element 804 adjacent to replacement element 840.

Additionally, in some aspects, fitting of replacement element 840 may include shaping of replacement element 840, including for example, adding a chamfer, filet, groove, notch, sipe, and the like to match the original tread profile. Fitting of replacement element 840 in this manner may include any of the material removal methods and apparatuses as described above with respect to the creation of removed material portion 330 in FIGS. 3A and 3B. For example, replacement element 840 may be buffed to obtain the desired dimensions of replacement element 840.

As illustrated in FIGS. 8A and 8B, replacement element 840 may in this manner be fitted to match the remainder of tread portion 802, such that tread portion 802 is repaired and has a similar appearance to tread portion 102 illustrated in FIGS. 1A and 1B.

Figure 9A:
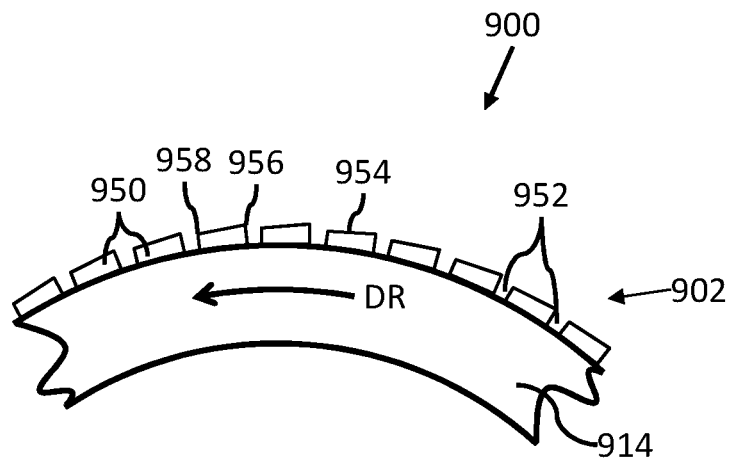
FIG. 9A illustrates an elevational view of an example tire 900 with heel-toe wear.
Figure 9B:
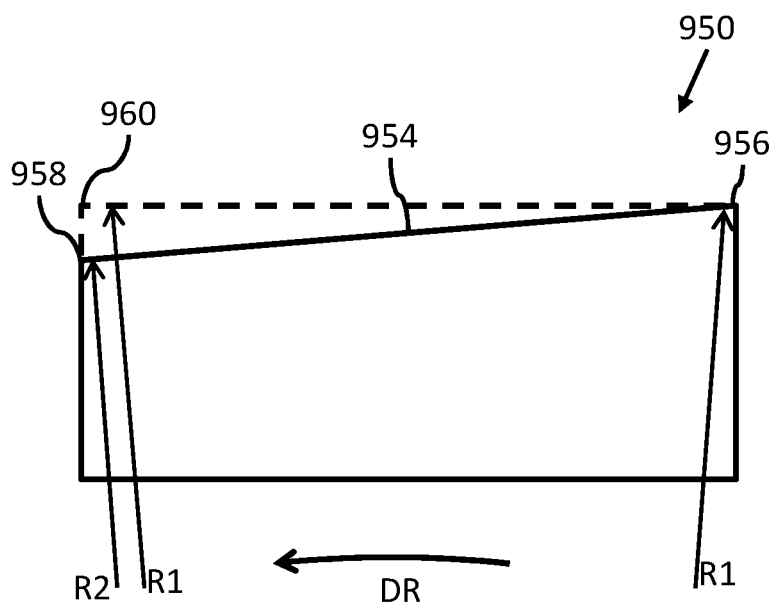
FIG. 9B illustrates an elevational view of a tread block 950 with heel-toe wear.

FIGS. 9A and 9B illustrate an example tire 900 and tread block 950 with heel-toe wear. Tire 900 may include a tread portion 902, a tire sidewall 914, a plurality of tread blocks 950 oriented in a series extending circumferentially, wherein adjacent tread blocks 950 separated by transverse grooves 952. Tread blocks 950 may include a radially outer running surface 954, which may contact a roadway. Running surface 954 may include a first end 956 having a radial height R1, and a second end 958 having a radial height R2. Radial height R1 may be greater than radial height R2. First end 956 and second end 958 may be circumferentially spaced from one another.

As illustrated, tire 900 may have a direction of rotation DR oriented counter-clockwise, such that second end 958 would strike a roadway first, and would thus be the heel, while first end 956 would strike the roadway second, and would thus be the toe. Therefore, as illustrated, tire 900 has irregular wear in a heel portion. It is understood that tire 900 could have irregular wear in a toe portion rather than the heel portion.

As illustrated in FIG. 9B, tread block 950 may have a running surface 954 that is uneven from heel to toe. A dotted line and a point 960 indicates the desired height of second end 958, but for the irregular heel-toe wear. Point 960 is oriented at a radial height R1, which is the same as first end 956.

Figure 10:
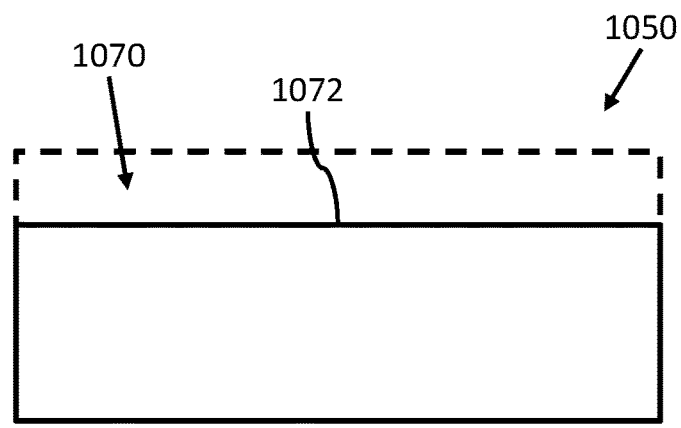
FIG. 10 illustrates an elevational view of a tread block 1050 with a removed material portion.

FIG. 10 illustrates a tread block 1050 with a removed material portion 1070. Tread block 1050 may include a removed material portion 1070, including a machined wall 1072 such that the radial height of tread block 1050 is altered from a desired height (indicated by a dotted line) to a radially shorter height of machined wall 1072.

A user may create removed material portion 1070 via any of a variety of mechanisms, including each of those described above with respect to the creation of removed material portion 330 in FIGS. 3A and 3B.

Figure 11:
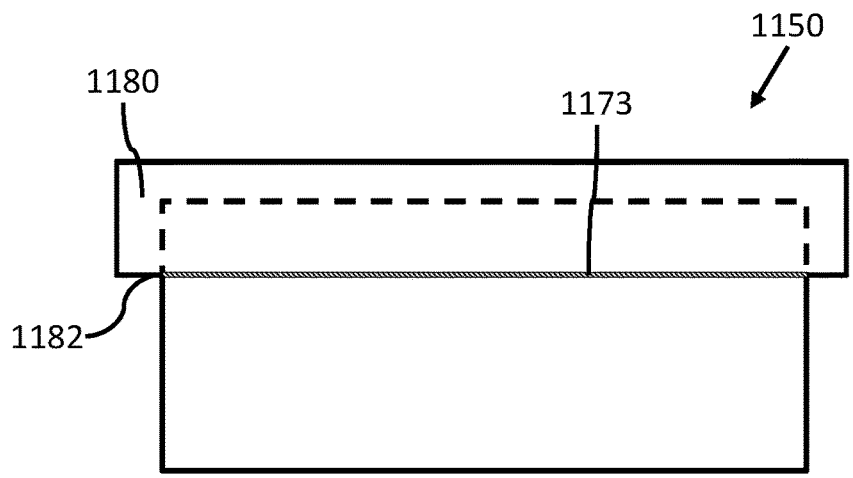
FIG. 11 illustrates an elevational view of a tread block 1150 with a replacement element applied to a removed material portion.

FIG. 11 illustrates a tread block 1150 with a replacement element 1180 applied to a removed material portion. Replacement element 1180 may include a tire contact edge 1182. Tire contact edge 1182 and machined wall (1072) may mate so as to allow the engagement of replacement element 1180 with tread block 1150.

Replacement element 1150 may have an axial width, circumferential length, and radial height, larger than that of removed material portion 1070 of FIG. 10. Alternatively, replacement element 1180 may have an axial width, circumferential length, and radial height, wherein at least one of the axial width, circumferential length, and radial height is the same as that of removed material portion 1070.

In practice, a series of replacement elements 1180 of varying dimensions may be provided. A user may assess the dimensions of the heel-toe worn void, and cut the removed material portion (1070) to a size larger than the void, in one or both of the radial height, circumferential length, and axial width dimensions. The user may then apply a replacement element 1180 to the removed material portion (1070) that is equal to, or larger than, the removed material portion (1070), in one or both of the radial height, circumferential length, and axial width dimensions.

Replacement element 1180 may be a pre-cured rubber element.

Before application of replacement element 1180 to the removed material portion (1070), an adhesive may be applied to the tire contact edge 1182 and machined walls (1072), forming an adhesive layer 1173. In this manner, replacement element 1180 may be fixed to the removed material portion (1070) via adhesive layer 1173.

The adhesive used in adhesive layer 1173 may be any variety of adhesives capable of adhering two pre-cured rubber items to one another, including those described above with respect to adhesive layer 443 in FIG. 4.

Figure 12:
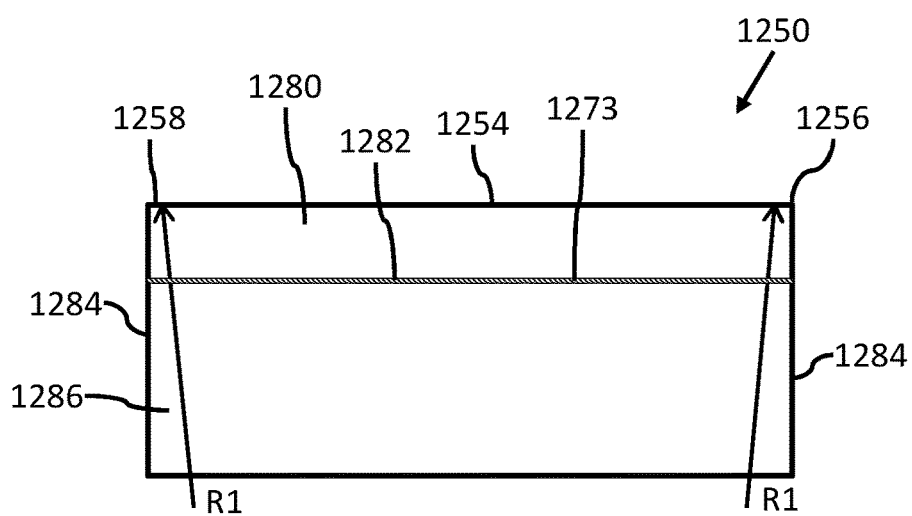
FIG. 12 illustrates an elevational view of a tread block 1250 with a replacement element fitted in a removed material portion.

FIG. 12 illustrates a tread block 1250 with a replacement element 1280 fitted in removed material portion. Replacement element 1280 may be adhered to machined wall (1072) via an adhesive layer 1273.

Replacement element 1280 may have dimensions perfectly matching those of the removed material portion (1070), at least in the radial height, circumferential length, and axial width dimensions.

Alternatively, replacement element 1280 may be oversized (such as replacement elements 1180 illustrated in FIG. 11). Thus, following curing of adhesive layer 1273, securing tire contact edge 1282 to the machined wall (1072), replacement element 1280 may be fitted (trimmed) such that the radially outermost portion of replacement element 1280 is even with radially desired height (indicated by a dotted line in FIGS. 9B-11). Tread block 1250 may include a radially outer running surface 1254, which may contact a roadway. Running surface 1254 may include a first end 1256 having a radial height R1, and a second end 1258 having a radial height R2. Radial height R1 may be equal to radial height R2, and as such, the heel-toe irregular wear may be repaired. Additionally, replacement element 1280 may be trimmed such that its circumferentially outermost portions are even with circumferentially outermost walls 1284 of tread block 1250. Replacement element 1280 may be trimmed such that its axially outermost portions are even with axially outermost walls 1286 of tread block 1250.

Replacement element 1280 may be fitted (trimmed) such that the axially outermost portion of replacement element 1280 is even with the axially outermost surface of tread block 1250 adjacent to replacement element 1280. Replacement element 1280 may be fitted (trimmed) such that the circumferentially outermost portion of replacement element 1280 is even with the circumferentially outermost surface of tread block 1250 adjacent to replacement element 1280. Replacement element 1280 may be fitted (trimmed) such that the axially outermost portion of replacement element 1280 is coplanar with the axially outermost surface of tread block 1250 adjacent to replacement element 1280. Replacement element 1280 may be fitted (trimmed) such that the circumferentially outermost portion of replacement element 1280 is coplanar with the circumferentially outermost surface of tread block 1250 adjacent to replacement element 1280.

Additionally, in some aspects, fitting of replacement element 1280 may include shaping of replacement element 1280, including for example, adding a chamfer, filet, groove, notch, sipe, and the like to match the original tread profile. Fitting of replacement element 1280 in this manner may include any of the material removal methods and apparatuses as described above with respect to the creation of removed material portion 330 in FIGS. 3A and 3B. For example, replacement element 1280 may be buffed to obtain the desired dimensions of replacement element 1280.

The repair to tread block 1250 may be duplicated over a plurality of tread blocks 1250 on a tire, similar to tire 900 illustrated in FIG. 9A. In this manner, tread blocks 1250 may be repaired and heel-toe irregular wear may be remedied, or mitigated, thus increasing the life of the tire.

Figure 13:
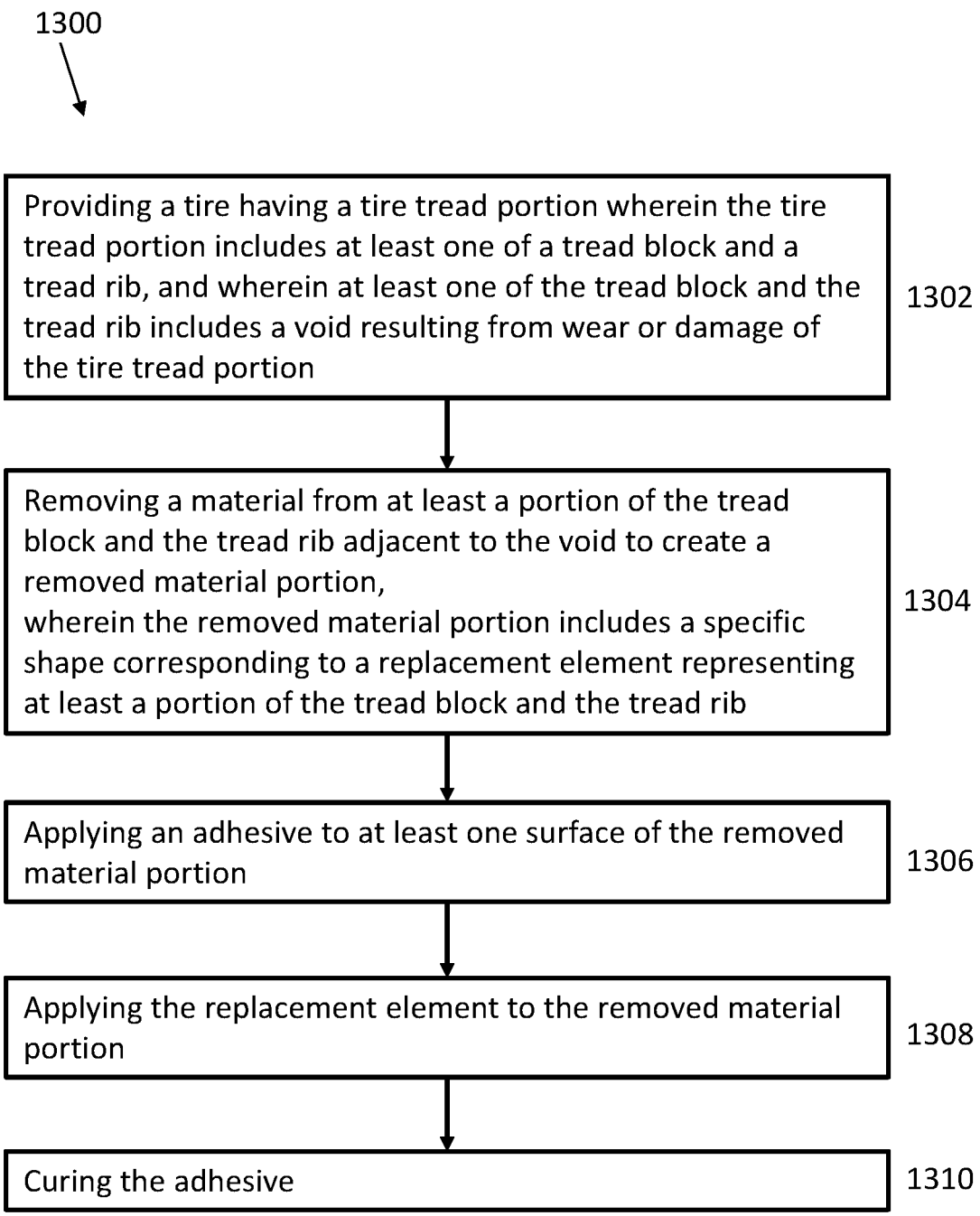
FIG. 13 illustrates a method 1300 for repairing a tire tread.

FIG. 13 illustrates a method 1300 for repairing a tire tread. Method 1300 may include: providing a tire having a tire tread portion wherein the tire tread portion includes at least one of a tread block and a tread rib, and wherein at least one of the tread block and the tread rib includes a void resulting from wear or damage of the tire tread portion (step 1302).

Method 1300 may further include: removing a material from at least a portion of the tread block and the tread rib adjacent to the void to create a removed material portion, wherein the removed material portion includes a specific shape corresponding to a replacement element (step 1304). Method 1300 may further include: applying an adhesive to at least one surface of the removed material portion (step 1306). Method 1300 may further include: applying the replacement element to the removed material portion (step 1308). Method 1300 may further include: curing the adhesive (step 1310).

The method may additionally include fitting the replacement element to the removed material portion and tread element via any method of cutting as described above, including for example, buffing.

Figure 14:
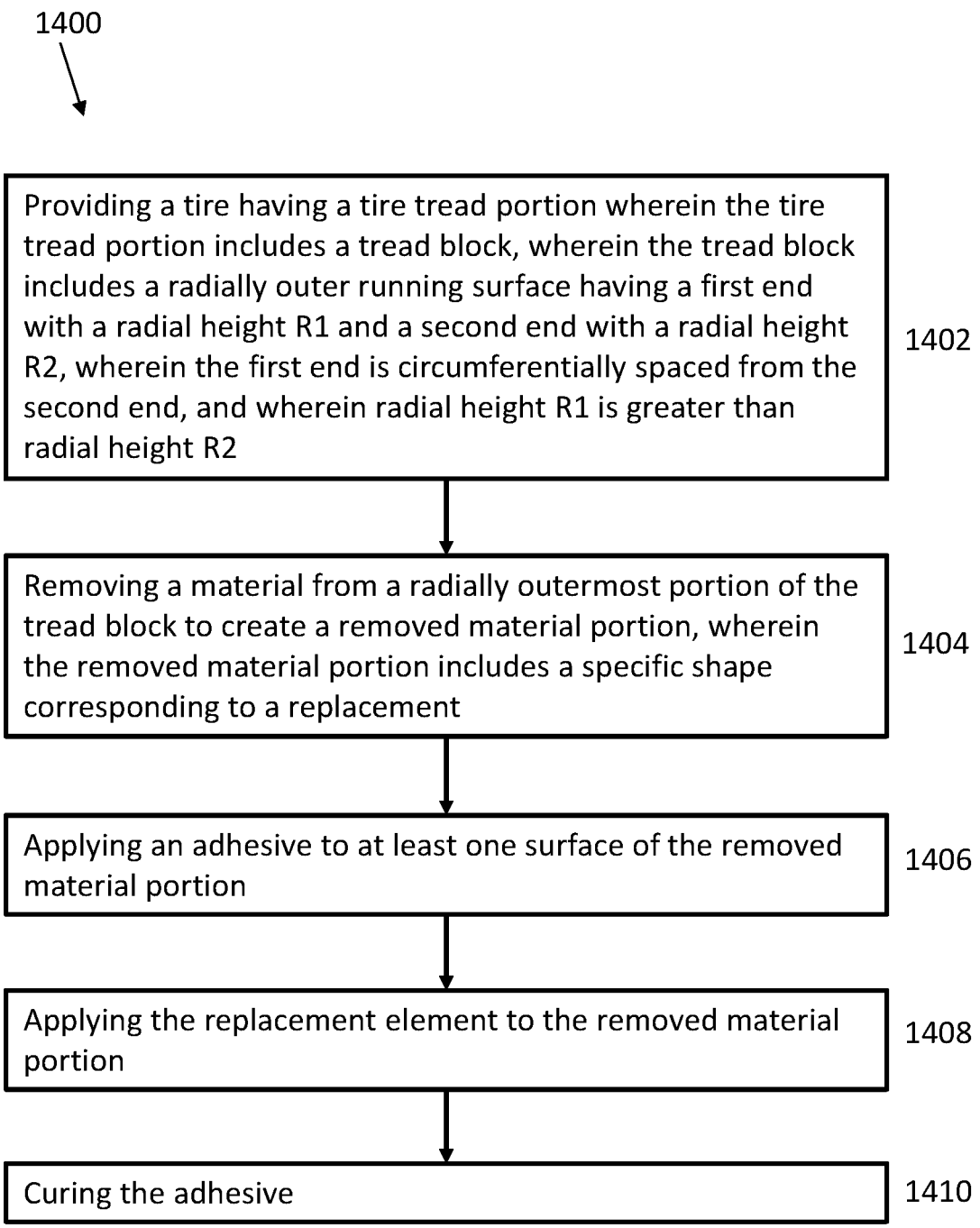
FIG. 14 illustrates a method 1400 for repairing a tire tread.

FIG. 14 illustrates a method 1400 for repairing a tire tread. Method 1400 may include: providing a tire having a tire tread portion wherein the tire tread portion includes a tread block, wherein the tread block includes a radially outer running surface having a first end with a radial height R1 and a second end with a radial height R2, wherein the first end is circumferentially spaced from the second end, and wherein radial height R1 is greater than radial height R2 (step 1402). Method 1400 may further include: removing a material from a radially outermost portion of the tread block to create a removed material portion, wherein the removed material portion includes a specific shape corresponding to a replacement (step 1404). Method 1400 may further include: applying an adhesive to at least one surface of the removed material portion (step 1406). Method 1400 may further include: applying the replacement element to the removed material portion (step 1408). Method 1400 may further include: curing the adhesive (step 1410).

The method may additionally include fitting the replacement element to the removed material portion and tread element via any method of cutting as described above, including for example, buffing.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10"

may mean from 9 to 11. Cartesian coordinates referenced herein are intended to comply with the SAE tire coordinate system.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A method for repairing a tire tread, comprising:
providing a tire having a tire tread portion wherein the tire tread portion includes a tread block,
wherein the tread block includes a radially outer running surface having a first end with a radial height $R1$ and a second end with a radial height $R2$, wherein the first end is circumferentially spaced from the second end, and wherein radial height $R1$ is greater than radial height $R2$;
removing a material from a radially outermost portion of the tread block to create a removed material portion, wherein the removed material portion includes a specific shape corresponding to a replacement;
applying an adhesive to at least one surface of the removed material portion;
applying the replacement element to the removed material portion; and
curing the adhesive.

2. The method of claim 1, wherein the replacement element is oversized relative to the removed material portion.

3. The method of claim 1, further comprising fitting the replacement element by trimming a material from the replacement element such that a radially outermost portion of the replacement element is equal to the radial height $R1$.

4. The method of claim 1, further comprising fitting the replacement element by trimming a material from the replacement element such that an axially outermost portion of the replacement element is even with an axially outermost surface of the tread block adjacent to the replacement element.

5. The method of claim 1, further comprising fitting the replacement element by trimming a material from the replacement element such that an axially outermost portion of the replacement element is coplanar with an axially outermost surface of the tread block adjacent to the replacement element.

6. The method of claim 1, further comprising fitting the replacement element by trimming a material from the replacement element such that a circumferentially outermost portion of the replacement element is even with a circumferentially outermost surface of the tread block adjacent to the replacement element.

7. The method of claim 1, further comprising fitting the replacement element by trimming a material from the replacement element such that a circumferentially outermost portion of the replacement element is coplanar with a circumferentially outermost surface of the tread block adjacent to the replacement element.

8. The method of claim 1, further comprising fitting the replacement element by shaping the replacement element by adding at least one of a chamfer, a filet, a groove, a notch, and a sipe.

9. The method of claim 1, wherein the adhesive is a heat cure cement.

10. The method of claim 1, further comprising fitting the replacement element by shaping the replacement element by one of a knife, a cutting tool, a rasp, a saw, a power tool, an abrasive wheel, an abrasive cone, an automated machine, including any of a variety of cutters or tire buffers, to obtain desired dimensions.

* * * * *